(12) United States Patent
Mizuno et al.

(10) Patent No.: US 9,150,026 B1
(45) Date of Patent: Oct. 6, 2015

(54) LIQUID JETTING APPARATUS

(71) Applicant: Brother Kogyo Kabushiki Kaisha, Nagoya-shi, Aichi-ken (JP)

(72) Inventors: Taisuke Mizuno, Nagoya (JP); Atsushi Ito, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/659,715

(22) Filed: Mar. 17, 2015

(30) Foreign Application Priority Data

Mar. 31, 2014 (JP) .................................. 2014-072421

(51) Int. Cl.
| | |
|---|---|
| B41J 2/175 | (2006.01) |
| B01D 35/02 | (2006.01) |
| B41J 2/195 | (2006.01) |
| B41J 2/20 | (2006.01) |
| B01D 35/027 | (2006.01) |
| B41J 2/19 | (2006.01) |
| B41J 2/14 | (2006.01) |

(52) U.S. Cl.
CPC ............. *B41J 2/17563* (2013.01); *B01D 35/02* (2013.01); *B41J 2/195* (2013.01); *B41J 2/20* (2013.01); *B01D 35/027* (2013.01); *B41J 2/19* (2013.01); *B41J 2002/14403* (2013.01); *B41J 2202/12* (2013.01)

(58) Field of Classification Search
CPC .................. B41J 2/17563; B41J 2002/14403; B41J 2/20; B41J 2/195; B41J 2/19; B41J 2202/12; B01D 35/02; B01D 35/027
USPC ......................................... 347/93, 92, 65, 85
See application file for complete search history.

(56) References Cited

U.S. PATENT DOCUMENTS

| | | | | |
|---|---|---|---|---|
| 5,457,485 | A | * 10/1995 | Moriyama et al. | 347/92 |
| 5,565,899 | A | * 10/1996 | Sugimoto et al. | 347/30 |
| 2001/0050017 | A1 | * 12/2001 | Ohsawa et al. | 101/465 |
| 2003/0197767 | A1 | * 10/2003 | Dudenhoefer et al. | 347/93 |
| 2004/0080586 | A1 | * 4/2004 | Horie | 347/85 |
| 2006/0017787 | A1 | * 1/2006 | Inoue et al. | 347/85 |

FOREIGN PATENT DOCUMENTS

JP  2011-110918  6/2011

* cited by examiner

*Primary Examiner* — Henok Legesse
(74) *Attorney, Agent, or Firm* — Frommer Lawrence & Haug LLP

(57) ABSTRACT

There is provided a liquid jetting apparatus including: a liquid jetting head; a cartridge installation portion; and an electroformed filter provided in a channel between the cartridge installation portion and the liquid jetting head. A lower limit $S_{min}$ of the area of the filter is expressed as:

$$S_{min} = \frac{aL + \sqrt{a^2 L^2 + 4ab}}{2}$$

provided that a is a constant expressed as:

$$a = \frac{128\mu Q}{N\pi d^4 \Delta P_M},$$

b is a constant expressed as: $b = \alpha_c CV_{total}$, and L is a thickness of the filter. An upper limit $S_{max}$ of the area of the filter is expressed as follows, $$S_{max} = \frac{S_b \cdot 0.9}{X}.$$

18 Claims, 6 Drawing Sheets

SCANNING DIRECTION
LEFT ⟷ RIGHT
↓ CONVEYANCE DIRECTION

SCANNING
DIRECTION
LEFT ⟷ RIGHT
↓ CONVEYANCE
DIRECTION

SCANNING
DIRECTION
LEFT ←→ RIGHT

↓ CONVEYANCE
DIRECTION

SCANNING
DIRECTION
⟷

LIQUID JETTING APPARATUS

CROSS REFERENCE TO RELATED APPLICATION

The present application claims priority from Japanese Patent Application No. 2014-072421, filed on Mar. 31, 2014, the disclosure of which is incorporated herein by reference in its entirety.

BACKGROUND

1. Field of the Invention

The present invention relates to a liquid jetting apparatus which is configured to jet a liquid from a nozzle.

2. Description of the Related Art

An ink jet recording apparatus including an ink jet head which is configured to jet ink from nozzles is known. The ink-jet recording apparatus includes four ink supply ports provided on the upper surface of the ink jet head. Each of four ink supply ports is provided with a filter portion which has the area same as that of the ink supply port and which is formed of a portion of a Ni filter. Accordingly, any foreign substance in the ink is captured by the filter portion when the ink flows into the ink jet head through each of the ink supply ports, and thus the foreign substance in the ink is prevented from flowing into the ink-jet head.

SUMMARY

In the ink jet recording apparatus described above, the flow resistance at the filter portion gradually increase due to the foreign substances captured by the filter portion as an operation period of the ink jet recording apparatus becomes longer. In a cases that the flow resistance at the filter portion becomes excessively large, it is impossible to supply the ink to the ink jet head in an ink amount required for jetting the ink from the nozzles. Thus, in the ink jet recording apparatus described above, it is necessary to design the area (size) of the filter portion to be large to some extent so that the flow resistance at the filter portion is low enough to allow the ink to flow into the ink-jet head in the required ink amount for jetting the ink from the nozzles, even after the ink jet recording apparatus has performed image printing for number of times exceeding the maximum printable number for the ink jet recording apparatus. On the other hand, in a case that that the area of the filter portion is designed to be too large, the size of the ink jet head would be also large, as a result.

An object of the present teaching is to provide a liquid jetting apparatus provided with a filter having an appropriate area, and a filter area determining method for determining an appropriate area for the filter.

A liquid jetting apparatus according to the present teaching includes:

a liquid jetting head configured to jet a liquid from a nozzle;

a cartridge installation portion to which a liquid cartridge retaining the liquid to be supplied to the liquid jetting head is installed; and a filter provided in a channel extending from the cartridge installation portion to the liquid jetting head, wherein, the filter is an electroformed filter which is formed by depositing metal on a master block and in which a plurality of through holes is formed, an area S of the filter satisfies a condition of $S_{min} \leq S \leq S_{max}$ provided that $S_{min}$ is a lower limit and $S_{max}$ is an upper limit, the lower limit $S_{min}$ is expressed as:

$$S_{min} = \frac{aL + \sqrt{a^2 L^2 + 4ab}}{2}$$

provided that $\mu$ is a viscosity of the liquid; Q is a maximum value of a flow rate of the liquid flowing through the filter in a case that the liquid is jetted from the nozzle; N is the number of the through holes per unit area of the filter; d is a diameter of the through holes; $\Delta P_M$ is an upper limit of a pressure drop of the liquid at the filter; $\alpha_c$ is a cake specific resistance (a cake suction resistance) of the liquid flowing through the filter; C is a particle density of the liquid flowing through the filter; $V_{total}$ is a maximum value of a total volume of the liquid flowing through the filter during a period in which the liquid jetting apparatus is used, a is a constant expressed as:

$$\alpha = \frac{128 \mu Q}{N \pi d^4 \Delta P_M}$$

b is a constant expressed as:

$$b = \alpha_c C\, V_{total}$$

and L is a thickness of the filter,
the upper limit $S_{max}$ is expressed as:

$$S_{max} = \frac{S_b \cdot 0.9}{X}$$

provided that $S_b$ is an area of the master block and X is a maximum number of a filter, having the area of the lower limit $S_{min}$ formable on the master block at a time.

A liquid jetting apparatus according to the present teaching includes:

a liquid jetting head configured to jet a liquid from a nozzle;

Y pieces of cartridge installation portions to which liquid cartridges retaining the liquid to be supplied to the liquid jetting head are installed respectively; and Y pieces of filters, having a plurality of through holes formed therein, provided in channels respectively, the channels extending from the Y pieces of cartridge installation portions to the liquid jetting head, wherein, an area S of the filter satisfies a condition of $S_{min} \leq S \leq S_{max}$ provided that $S_{min}$ is a lower limit and $S_{max}$ is an upper limit, the lower limit $S_{min}$ is expressed as:

$$S_{min} = \frac{aL + \sqrt{a^2 L^2 + 4ab}}{2}$$

provided that $\mu$ is a viscosity of the liquid; Q is a maximum value of a flow rate of the liquid flowing through the filter in a case that the liquid is jetted from the nozzle; N is the number of the through holes per unit area of the filter; d is a diameter of the through holes; $\Delta P_M$ is an upper limit of a pressure drop of the liquid at the filter; $\alpha_c$ is a cake specific resistance of the liquid flowing through the filter; C is a particle density of the liquid flowing through the filter; $V_{total}$ is a maximum value of a total volume of the liquid flowing through the filter during a period in which the liquid jetting apparatus is used, a is a constant expressed as:

$$\alpha = \frac{128\mu Q}{N\pi d^4 \Delta P_M}$$

b is a constant expressed as:

$$b = \alpha_c C V_{total}$$

and L is a thickness of the filter,
the upper limit $S_{max}$ is expressed as follows.

$$S_{max} = \frac{Y+1}{Y} S_{min}$$

A liquid jetting apparatus according to the present teaching includes:
a liquid jetting head configured to jet a liquid from a nozzle;
a cartridge installation portion to which a liquid cartridge retaining the liquid to be supplied to the liquid jetting head is installed; and
a filter which is provided in a channel extending from the cartridge installation portion to the liquid jetting head and in which a plurality of through holes is formed,
wherein, the cartridge installation portion is configured such that a plurality types of the liquid cartridges are capable of selectively being installed in the cartridge installation portion,
an area S of the filter satisfies a condition of $S_{min} \leq S \leq S_{max}$ provided that $S_{min}$ is a lower limit and $S_{max}$ is an upper limit,
the lower limit $S_{min}$ is expressed as:

$$S_{min} = \frac{aL + \sqrt{a^2L^2 + 4ab}}{2}$$

provided that μ is a viscosity of the liquid; Q is a maximum value of a flow rate of the liquid flowing through the filter in a case that the liquid is jetted from the nozzle; N is the number of the through holes per unit area of the filter; d is a diameter of the through holes; $\Delta P_M$ is an upper limit of a pressure drop of the liquid at the filter; $\alpha_c$ is a cake specific resistance of the liquid flowing through the filter; C is a particle density of the liquid flowing through the filter; $V_{total}$ is a maximum value of a total volume of the liquid flowing through the filter during a period in which the liquid jetting apparatus is used, a is a constant expressed as:

$$\alpha = \frac{128\mu Q}{N\pi d^4 \Delta P_M}$$

b is a constant expressed as:

$$b = \alpha_c C V_{total}$$

and L is a thickness of the filter,
the upper limit $S_{max}$ is expressed as:

$$S_{max} = \frac{aL + \sqrt{a^2L^2 + 4ab_{max}}}{2}$$

provided that $(\alpha_c C)_{max}$ is the product $\alpha_c C$ of certain liquid, the product $\alpha_c C$ being the product of the cake specific resistance $\alpha_c$ and the particle density C, the certain liquid being a liquid having a value of $\alpha_c C$ which is the largest among values of $\alpha_c C$ of liquids retained in the plurality types of liquid cartridges respectively, and $b_{max}$ is a constant expressed as follows.

$$b_{max} = (\alpha_c C)_{max} V_{total}$$

EMBODIMENTS

First Embodiment

Figure 1:
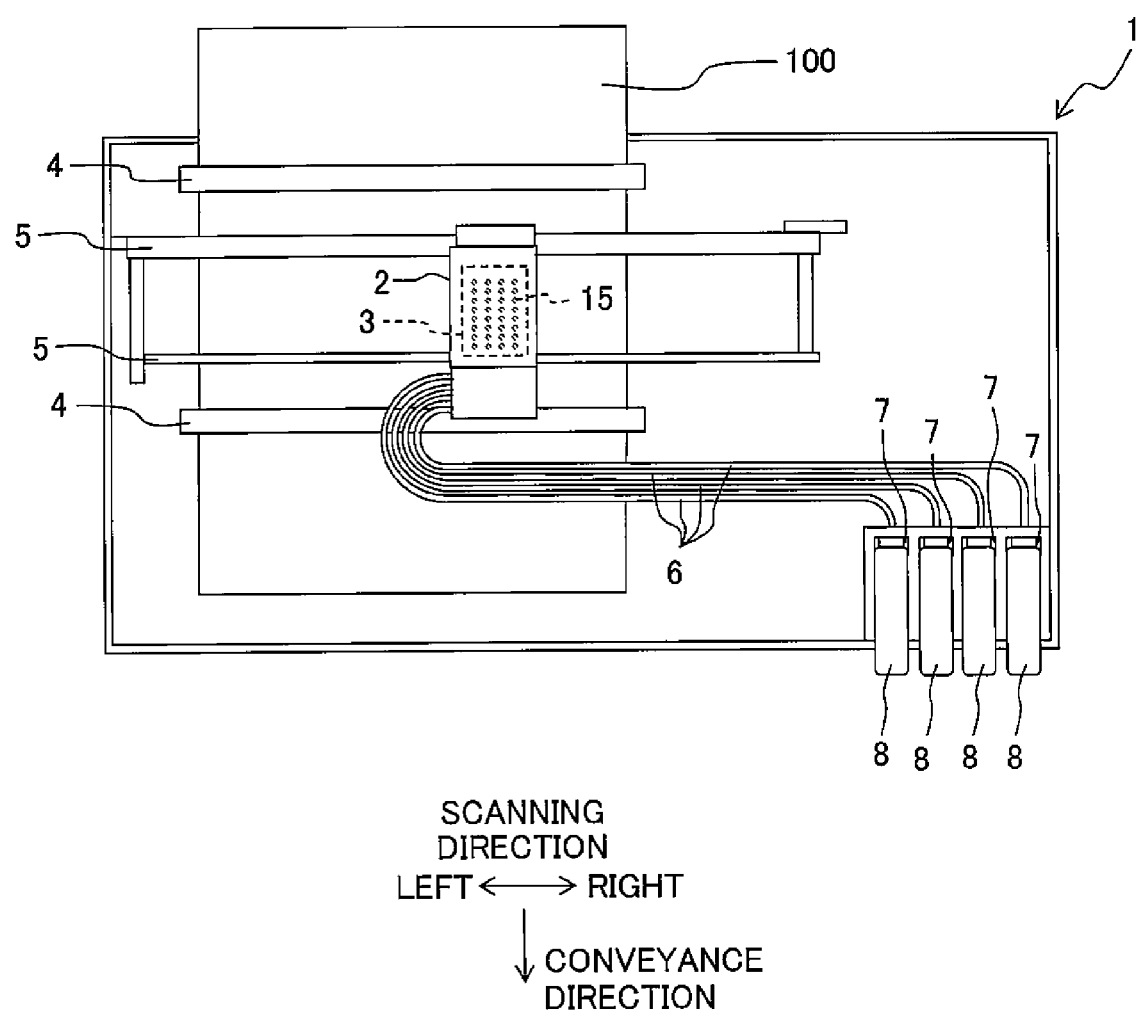
FIG. 1 is a schematic configuration diagram of a printer according to the first embodiment of the present teaching.
Figure 2:
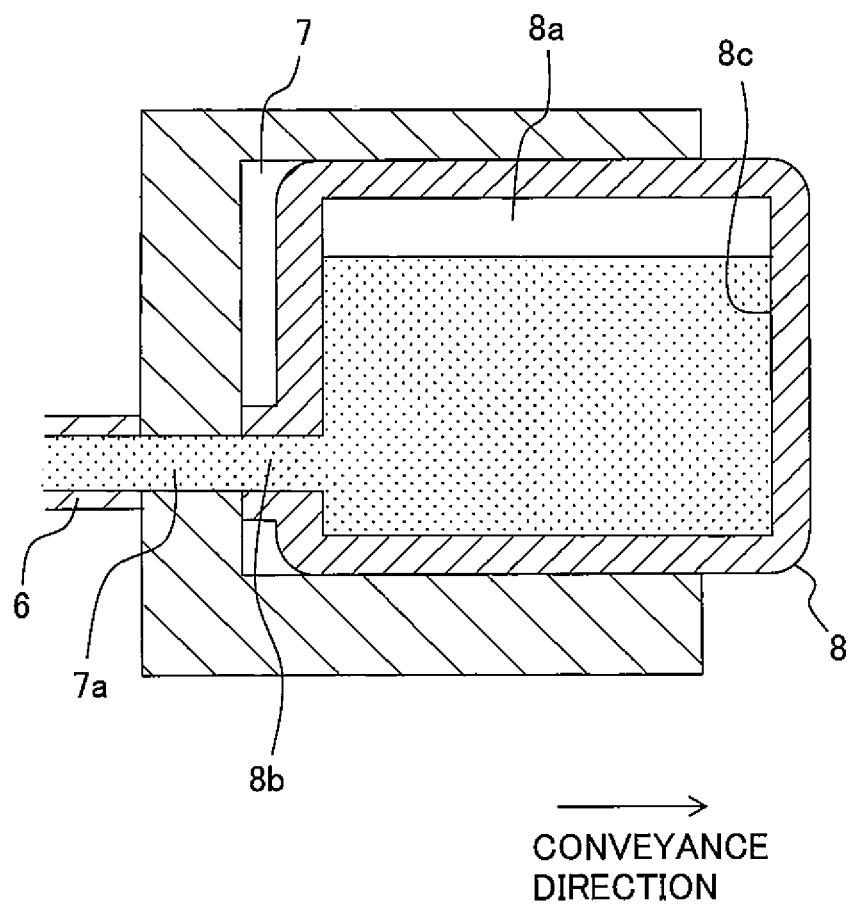
FIG. 2 is a cross-sectional view taken along the line II-II in FIG. 1.

In the following, a first embodiment of the present teaching will be explained.
As depicted in FIG. 1, a printer 1 includes a carriage 2, an ink jet head 3, conveyance rollers 4, etc.
The carriage 2 is supported on two guide rails 5 extending in a scanning direction, and the carriage 2 reciprocates in the scanning direction along the guide rails 5. In the following explanation, the right side and the left side in the scanning direction are defined as depicted in FIG. 1.
The ink-jet head 3 is carried on the carriage 2, and jets ink from a plurality of nozzles 15 formed on the lower surface of the ink-jet head 3. The ink-jet head 3 is connected with four cartridge installation portions 7 via four tubes 6. An ink cartridge 8 is installed in each of the four cartridge installation portions 7. As depicted in FIG. 2, a rectangular parallelepiped retaining space 8a for retaining the ink is defined in the ink cartridge 8. When the ink cartridge 8 is installed in the cartridge installation portion 7, a supply channel 8b, of the ink cartridge 8, which communicates with the retaining space 8a is connected to an ink channel 7a formed in the cartridge installation portion 7. Note that although a valve, etc. are provided in the supply channel 8b, such valve, etc. are omitted from FIG. 2. Further, the ink channel 7a is connected with the tube 6 at an end portion thereof on a side opposite to the other end portion thereof that is connected with the supply channel 8b. With this connection, the ink inside the retaining space 8a flows into the tube 6 through the ink channel 7a. The ink cartridges 8 installed in the cartridge installation portions 7 which are arranged in the left-to-right direction, respectively, are filled with four color inks that are black, yellow, cyan and magenta inks respectively and sequentially by this listing order of the colors such that an ink cartridge 8 installed in a leftmost cartridge installation portion 7 is filled with the black ink, and so on. The four color inks filled in those ink cartridges 8 are supplied to the ink-jet head 3.

The conveyance rollers 4 are arranged on both sides of the carriage 2 in a conveyance direction orthogonal to the scanning direction, and the conveyance rollers 4 convey a recording sheet (recording paper sheet) 100 in the conveyance direction.

In the printer 1, printing is performed on the recording sheet 100 by jetting the ink(s) from the ink jet head 3 reciprocating in the scanning direction together with the carriage 2, while conveying the recording sheet 100 in the conveyance direction by the conveyance rollers 4.

Figure 3:
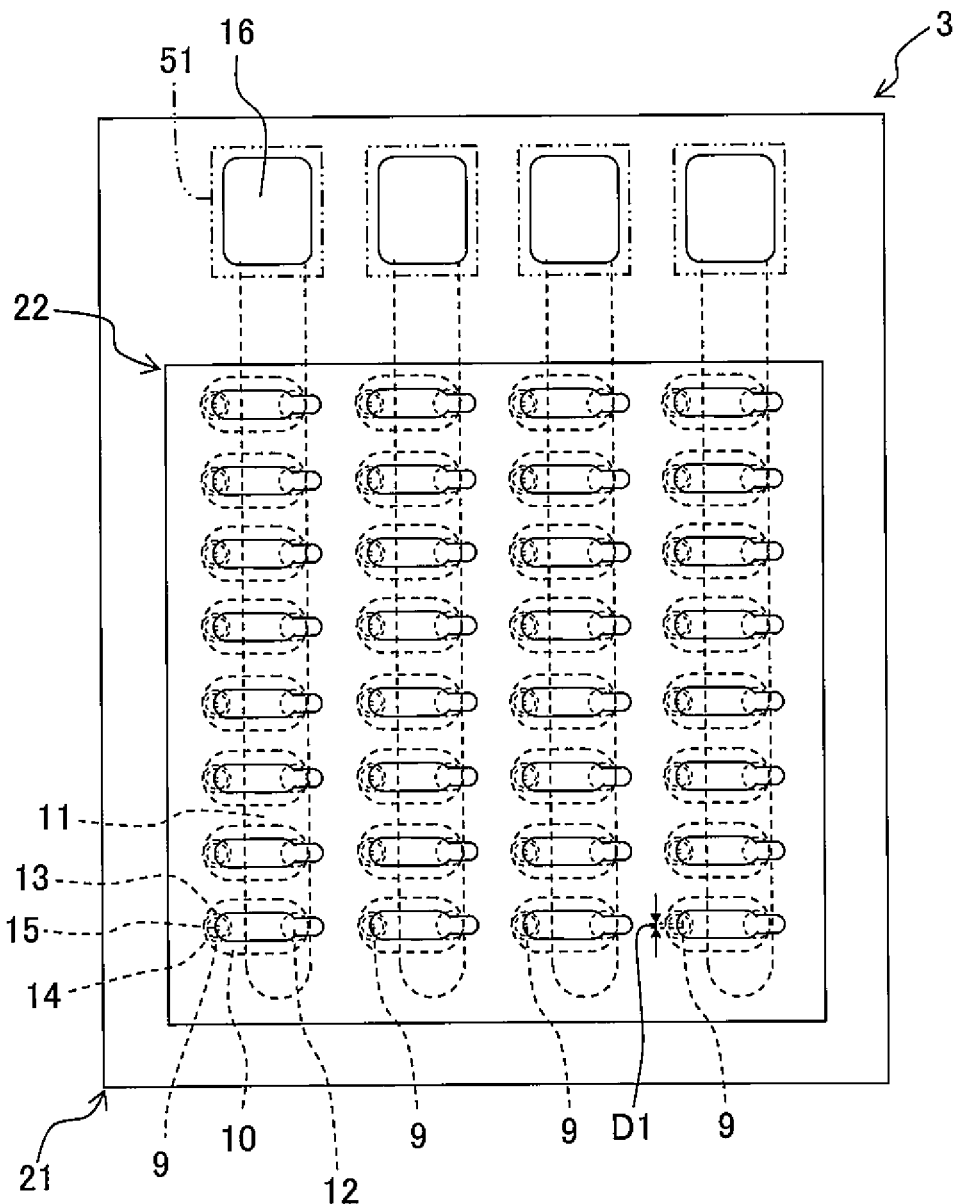
FIG. 3 is a plan view of an ink-jet head.
Figure 4:
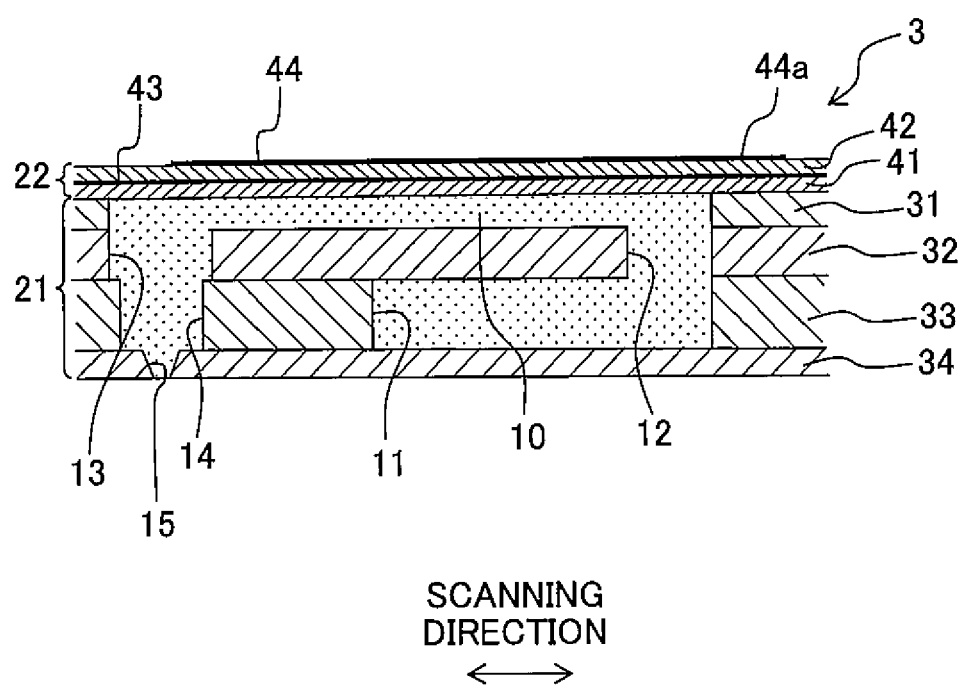
FIG. 4 is a cross-sectional view taken along the line IV-IV in FIG. 3.

Next, the ink jet head 3 will be explained. As depicted in FIGS. 3 and 4, the ink-jet head 3 includes a channel unit 21 in which ink channels including the nozzles 15 and pressure chambers 10 (which will be described later), etc. are formed, and a piezoelectric actuator 22 for applying pressure to the ink in the pressure chambers 10.

The channel unit 21 is formed by stacking four plates 31, 32, 33 and 34 on each other. Of the four plates 31 to 34, three plates 31, 32 and 33 are formed of a metallic material such as stainless steel, and the plate 34 is formed of a synthetic-resin material such as polyimide. Alternatively, the plate 34 may be formed also of a metallic material similar to the metallic material forming the plates 31 to 33.

The plurality of nozzles 15 are formed on the plate 34. A diameter D1 of each of the nozzles 15 is approximately 20 μm. The plurality of nozzles 15 are arranged in the conveyance direction to form a nozzle row 9, and four nozzle rows 9 are arranged in the scanning direction on the plate 34. Among the plurality of nozzles 15, nozzles 15 forming a first (leftmost) nozzle row 9 jet the black ink, nozzles 15 forming a second nozzle row 9 on the right side of the first (leftmost) nozzle row 9 jet the yellow ink, nozzles 15 forming a third nozzle row 9 on the right side of the second nozzle row 9 jet the cyan ink and nozzles 9 forming a fourth (rightmost) nozzle row 9 jet the magenta ink.

A plurality of pressure chambers 10 are formed in the plate 31. In a plan view, each of the pressure chambers 10 has an elliptical shape with the major axis in the scanning direction or a rectangular shape with rounded corners (a shape of a running track) having the longitudinal direction in the scanning direction. Each of the pressure chambers 10 is provided corresponding individually to one of the nozzles 15, and the left end portion of each pressure chamber 10 is overlapped with the nozzle 15 corresponding thereto.

A plurality of through holes 12 each having a circular shape are formed at portions of the plate 32 respectively, each portion being overlapped with right end portion of each pressure chamber 10. Further, a plurality of through holes 13 each having a circular shape are formed at portions of the plate 32 respectively, each portion being overlapped with the left end portion of the pressure chamber 10.

Four manifold channels 11 are formed in the plate 33. The four manifold channels 11 are provided corresponding to the four nozzle rows 9, respectively. Each of the four manifold channels 11 extends in the conveyance direction, and is overlapped with right half portions of the pressure chambers 10 which overlap with the nozzles 15 forming the nozzle row 9 corresponding to the manifold channel 11 concerned. Each manifold channel 11 is connected to the tube 6 via ink supply port 16 which is arranged at the upstream-side end of the ink jet head 3 in the conveyance direction and which is opened on the upper surface of the channel unit 21. With this, the ink is supplied from the ink supply port 16 to each manifold channel 11. A plurality of through holes 14 each having a circular shape are formed at portions, of the plate 33, overlapping with the through holes 13, respectively.

In the channel unit 21, each manifold channel 11 is in communication with the pressure chambers 10 via the through holes 12, and each pressure chamber 10 is in communication with each nozzle 15 via each through hole 13 and each through hole 14. In this manner, a plurality of individual ink channels each extending from an exit portion of the manifold channel 11 to the nozzle 15 via the pressure chamber 10 are formed in the channel unit 21.

The piezoelectric actuator 22 includes an ink separating layer 41, an piezoelectric layer 42, a common electrode 43 and a plurality of individual electrodes 44. The ink separating layer 41 is made of a piezoelectric material composed mainly of lead zirconate titanate which is a mixed crystal of lead titanate and lead zirconate, and is arranged on the upper surface of the channel unit 21 such that the plurality of pressure chambers 10 are covered with the ink separating layer 41. Note that, unlike the piezoelectric layer 42 which will be explained next, the ink separating layer 41 may be made of an insulating material, such as the synthetic-resin material, which is different from the piezoelectric material.

The piezoelectric layer 42 is made of the piezoelectric material described above, and extends continuously on the upper surface of the ink separating layer 41 and over the plurality of pressure chambers 10. The common electrode 43 is arranged between the ink separating layer 41 and the piezoelectric layer 42 and extends continuously over the entire areas of the ink separating layer 41 and the piezoelectric layer 42. Further, the common electrode 43 is always kept at a ground potential.

The plurality of individual electrodes 44 are provided, on the upper surface of the piezoelectric layer 42, corresponding individually to the plurality of pressure chambers 10, respectively. Each of the individual electrodes 44 has an elliptic shape or an rectangular shape with rounded corners (a shape of a running track) that is smaller to some extent than the pressure chamber 10, and each of the individual electrodes 44 is arranged to be overlapped with a center portion of the pressure chamber 10 corresponding thereto. The left end portion of each individual electrode 44 extends to a position not overlapping with the pressure chamber 10 corresponding thereto, and the tip of the extended portion functions as a connecting terminal 44a. A driver IC (not depicted) is connected to the connecting terminals 44a. Any one of the ground potential and a driving potential (approximately 20V, for example) is selectively applied to each of the individual electrodes 44 by the driver IC individually.

In correspondence with the arrangement of the common electrode 43 and the individual electrodes 44 as described above, the portions of the piezoelectric layer 42 which are sandwiched between the common electrode 43 and the individual electrodes 44 are polarized in the direction of the thickness of the piezoelectric layer 42.

Here, an explanation will be made about a method for jetting the ink from the nozzles 15 by driving the piezoelectric actuator 22. In the piezoelectric actuator 22, the electrical potential of all of the individual electrodes 44 are kept at the ground potential in advance. When the ink is jetted from one nozzle 15, the electrical potential of one individual electrode 44 corresponding to the nozzle 15 concerned is switched to a driving potential. By doing so, an electric field is produced at a portion, of the piezoelectric layer 42, which is sandwiched between the common electrode 43 and the individual electrode 44 concerned in the direction of the thickness of the piezoelectric layer 42, that is a direction parallel to the polarization direction of the piezoelectric layer 42. Due to this electric field, this portion of the piezoelectric layer 42 contracts in the horizontal direction orthogonal to the polarization direction. With this, portions of the ink separating layer 41 and the piezoelectric layer 42, the portions being overlapped with the pressure chamber 10, deforms so that the portions project toward the pressure chamber 10. As a result, the volume of the pressure chamber 10 is reduced, the pressure of the ink in the pressure chamber 10 is increased, and then the ink is jetted from the nozzle 15 in communication with the pressure chamber 10.

Figure 5A:
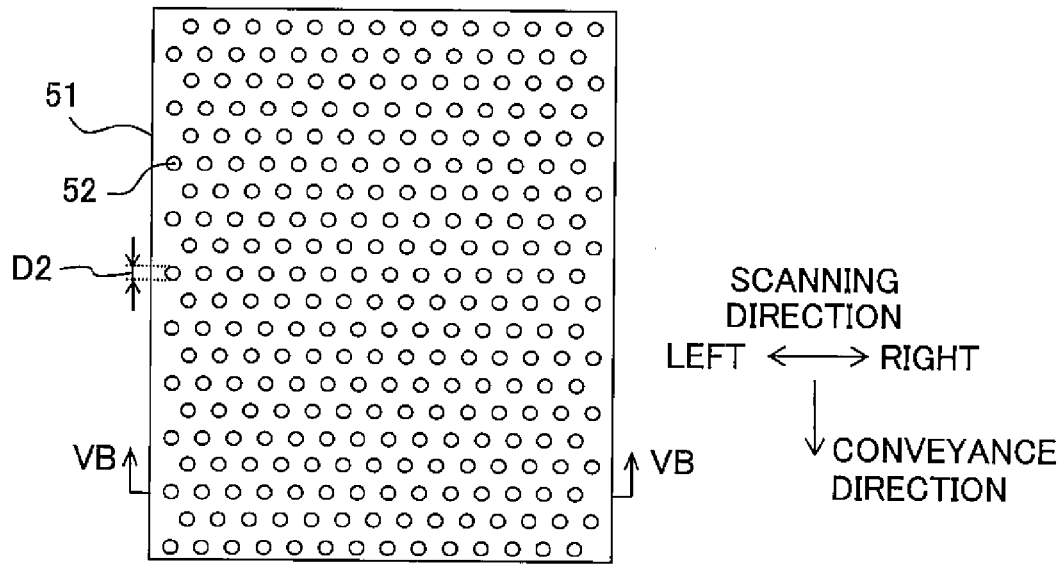
FIG. 5A is a plan view of a filter.
Figure 5B:
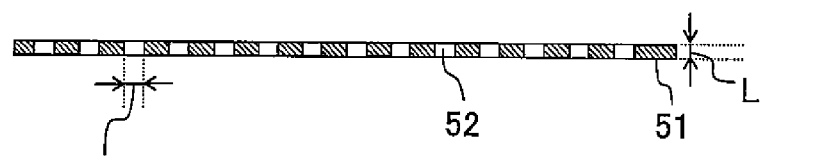
FIG. 5B is a cross-sectional view taken along the line VB-VB in FIG. 5A.

In the ink jet head 3, filters 51 are provided at portions which are overlapped with the four ink supply ports 16 on the upper surface of the channel unit 21, respectively. Each of the filters 51 is so-called an electroformed filter, and has a plurality of through holes 52 as depicted in FIGS. 5A and 5B. A diameter D2 of each of the through holes 52 is not more than 20 μm, for example, 10 μm, etc. Note that, in FIGS. 5A to 5C, through holes 52 are depicted in enlarged manner for convenience.

In the first embodiment, when the ink flows into the ink jet head 3 via the ink supply ports 16, any foreign substances in the ink are captured by the filters 51, and thus an inflow of the foreign substances in the ink into the ink jet head 3 is prevented. Here, a specific example of the foreign substances in the ink is a fragment (small piece) of a skin of a worker making (assembling) an ink cartridge, etc., and the majority of the foreign substances in the ink has a size larger than 40 μm. In contrast, in the first embodiment, the diameter D2 of each of the through holes 52 of the filters 51 is not more than 40 μm, and thus it is possible to capture the foreign substances in the ink without fail.

In a case that the foreign substance in the ink has flown into the ink jet head 3, if the foreign substance flown into the ink-jet head 3 is larger than the diameter D1 of the nozzles 15, there is a fear that the nozzle 15 might be clogged with the foreign substance flown into the ink jet head 3. In the first embodiment, although the diameter D1 of the nozzles 15 is approximately 20 μm, the diameter D2 of through holes 52 of the filters 51 is approximately 10 μm that is smaller than the diameter D1 of the nozzles 15. Thus, the foreign substances in the ink that is larger than the diameter D1 of the nozzles 15 are captured by the filters 51 without fail. With this, it will be prevented certainly that an inflow of the foreign substance, having a size larger than the diameter D1 of the nozzles 15, into the ink jet head 3.

Here, in the first embodiment, the channel resistance is large at the ink supply ports 16 due to the filters 51 provided at the ink supply ports 16. Further, as an operation period of the printer 1 becomes longer, the amount of the foreign substances accumulated on the filters 51 increases and thus the channel resistance at the ink supply ports 16 increases. If the channel resistance at the ink supply ports 16 is excessively large, it is impossible to supply the ink to the ink-jet head 3 in the required ink amount for jetting the ink from the nozzles 15. In view of the above, the area of each ink supply ports 16 and the area of each filter 51 are required to be large to some extent. However, making the area of each ink supply port 16 and the area of each filter 51 excessively large may lead to a large size ink jet head 3.

In the first embodiment, the area of each ink supply port 16 and the area of each filter 51 are determined as follows. Note that in this specification, the area S of the filter 51 means the area of a portion of each filter 51, the portion being overlapped with one of the ink supply ports 16 and actually capturing the foreign substances in the ink, and the area S of the filter 51 does not include the area of a portion, of each filter 51, provided outside of the ink supply port 16. That is, the area S of the filter 51 is same as the cross section of each ink supply port 16.

Figure 5C:
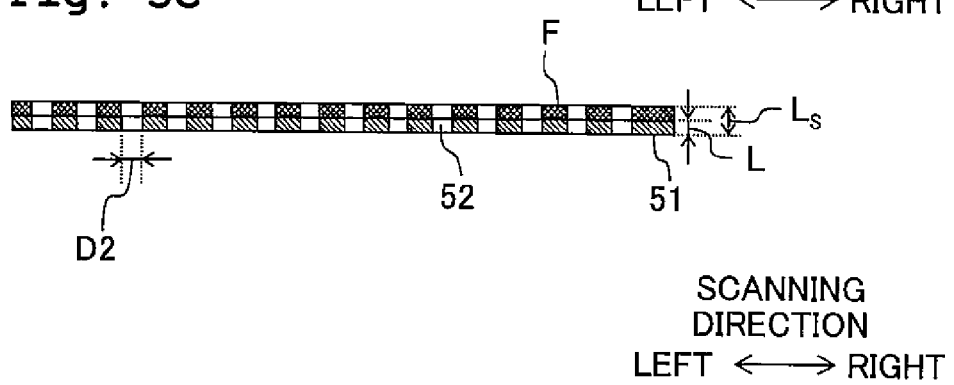
FIG. 5C depicts a state in which substances are accumulated on the filter.

In the printer 1 of the first embodiment, the diameter D2 of through holes 52 of the filters 51 is smaller than the majority of the foreign substances in the ink, as described above. In such a case, the pressure drop ΔP at each filter 51 can be estimated appropriately by estimating the pressure drop ΔP at each filter 51 based on so called the cake theory. In the cake theory, the situation on the filter 51 is regarded as follow. That is, as the amount of foreign substances captured by the filter 51 increases as depicted in FIG. 5C, the amount of foreign substances F accumulated on the surface of the filter 51 increases, and thereby the thickness Ls, that is the sum of the thickness L of the filter 51 and the height of the accumulated foreign substances F, becomes large without changing the pore size (the diameter) of each through hole 52. The cake theory estimates the pressure drop ΔP at the filter 51 based on the above understanding of the situation on the filter 51.

When the cake theory is applied, the pressure drop ΔP [Pa] at the filter 51 is expressed as:

$$\Delta P = \frac{128\mu Q}{NS\pi d^4}\left(L + \alpha_c C \frac{V_{total}}{S}\right) \tag{1}$$

using the Hagen Poiseuille equation. In the equation (1), under the assumption that the entire portion of the filter 51 is overlapped with the supply port 16, S is the area of the filter 51, μ, [Pa·S] is the viscosity of the ink, Q [m³/s] is the maximum value of the flow rate of the ink flowing through the filter 51 when the ink is jetted from the plurality of nozzles 15, N is the number of through holes 52 per unit area of the filter 51, d [m] is the diameter of the through holes 52, $\alpha_c$ [m³/kg] is a cake specific resistance (cake suction resistance) of the ink flowing through the filter 51, C [kg/m³] is the particle density of the ink flowing through the filter 51, $V_{total}$ [m³] is the maximum value of the total volume of the ink flowing through the filter 51 during the period in which the printer 1 is used, and L [m] is the thickness of the filter 51. Note that μ, Q, N, d, $\alpha_c$, $V_{total}$ described above will be explained later in detail.

Then, provided that $\Delta P_M$[Pa] is the upper limit of the pressure drop at the filter 51, if the area S of the filter 51 is determined such that the condition of $\Delta P \leq \Delta P_M$ is always fulfilled until the maximum printable number of images for the printer 1 (described later) has been printed by the printer 1, the pressure drop ΔP at the filter 51 does not exceed $\Delta P_M$ until the maximum printable number of images for the printer 1 has been printed by the printer 1. Note that $\Delta P_M$ described above will be explained later in detail. The area $S_{min}$ of the filter 51 obtained from the above equation (1) in a case that the condition of $\Delta P = \Delta P_M$ holds is expressed as:

$$S_{min} = \frac{aL + \sqrt{a^2 L^2 + 4ab}}{2}$$

provided that a is $$a = \frac{128\mu Q}{N\pi d^4 \Delta P_M}$$

and b is as follows.

$$b = \alpha_c C V_{total}$$

Accordingly, in the first embodiment, the area S of the filter 51 (which is also the area of the ink supply port 16) is determined such that the area S is not less than the lower limit $S_{min}$.

Next, $\mu$, Q, N, d, $\alpha_c$, $V_{total}$ and $\Delta P_M$ described above will be explained in detail.

The viscosity of the ink is, for example, the viscosity of the ink when the ink is poured into the ink cartridge 8.

The maximum value Q of the flow rate of the ink flowing through the filter 51 when the ink is jetted from the plurality of nozzles 15 is the maximum value of the flow rate of the ink supplied to the ink-jet head 3 flowing through the filter 51 when the ink is jetted from the plurality of nozzles 15 at the ink-jet head 3. For example, in a case that the ink-jet head 3 is capable of jetting an ink selectively in various volumes from each nozzle 15 constructing one of the nozzle rows 9, the maximum value Q means the flow rate of the ink flowing into the ink-jet head 3 flowing through the filter 51 corresponding to the nozzle row 9 concerned when every nozzles 15 constructing the nozzle rows 9 concerned jet the ink in the largest volume among the various volumes.

In cases that the through holes 52 are unevenly distributed over the filter 51, etc., the number N of through holes 52 per unit area of the filter 51 is regarded as the average value of the numbers of the through holes 52 per unit area obtained at every sections of the filter 51 respectively. In a case that there are variations in diameters of the plurality of through holes 52 formed on the filter 51, the diameter d of the through hole 52 is regarded as, for example, the average value of the diameters of the plurality of through holes 52.

The cake specific resistance $\alpha_c$ is a coefficient which is used when estimating the pressure drop $\Delta P$ based on the cake theory. The cake specific resistance $\alpha_c$ is the volume of the foreign substances per unit mass of the foreign substances, and the value of the cake specific resistance $\alpha_c$ depends on the sizes of the foreign substances in the ink. The particle density C of the ink is the mass of the foreign substances per unit volume of the ink flowing through the filter 51, and the value of the particle density C of the ink depends on the mass of the substances mixed in the ink and the number of the foreign substances per unit volume of the ink.

In view of the above, in a case that only one type of ink cartridge 8 is installed in each cartridge installation portion 7, the value of the cake specific resistance of the ink in the ink cartridge 8 of this type is regarded as the value of the cake specific resistance $\alpha_c$ in the above equation (1). In this case, the value of the particle density of the ink in the ink cartridge 8 of this type is regarded as the value of the particle density C in the above equation (1).

Here, the cake specific resistance and the particle density of the ink in each ink cartridge 8 will be explained. For example, it is possible to obtain the product $\alpha_c C$ of the cake specific resistance and the particle density of the ink in each ink cartridge 8 from a pressure difference between the up-stream side and the down-stream side of the filter 51, the pressure difference being observed after the ink retained in each ink cartridge 8 has been flown through the filter 51 in an certain amount. Here, the value of the product $\alpha_c C$ is constant with respect to a filter to which the cake theory is applicable. The value of the product $\alpha_c C$ corresponds to a slope of a line drawn in a graph in which the flow rate is the horizontal axis and the cake-thickness, which is the thickness of substances accumulated on the filter, is the vertical axis.

In equation (1), the cake specific resistance $\alpha_c$ and the particle density C is used in the form of the product $\alpha_c C$. Thus, it is enough if the product $\alpha_c C$ is obtained as described above, and obtaining separately the cake specific resistance $\alpha_c$ and the particle density C of the ink in each cartridge 8 is unnecessary. Note that it is possible to separately obtain the cake specific resistance $\alpha_c$ and the particle density C of the ink in each cartridge 8. The particle density C of the ink in each ink cartridge 8 can be obtained by, for example, detecting the number of the foreign substances per unit volume of the ink and the average mass of the foreign substances by performing analysis etc. on the ink in each ink cartridge 8, and then multiplying the average mass of the foreign substance by the detected number of foreign substances per unit volume of the ink. Further, it is possible to obtain the cake specific resistance $\alpha_c$ of the ink in each ink cartridge 8 by dividing the product $\alpha_c C$ by the obtained particle density C.

On the other hand, in a case that a plurality types of ink cartridges 8 having mutually different ink storage (ink storage amount) are selectively installed in each cartridge installation portion 7, the cake specific resistance and the particle density of one of the ink cartridges 8 among the plurality of types of ink cartridges 8 may be different from the cake specific resistance and the particle density of another ink cartridge 8 among the plurality of types of ink cartridges 8.

To be explained more detail, in a case that production environments etc. of the plurality types of ink cartridges 8 are different from each other, sizes of foreign substances mixed in the ink are different among the plurality types of ink cartridges 8. That is, the cake specific resistance of the ink varies among the plurality types of ink cartridges 8. Further, in this case, the mass of the substances mixed in the ink and the number of the foreign substances per unit volume of the ink varies among the plurality types of ink cartridges 8. Accordingly, the particle density of the ink varies among the plurality types of ink cartridges 8.

Further, even if the production environments etc. of the plurality types of ink cartridges 8 are same, the particle density of the ink may vary among the plurality types of ink cartridges 8. For example, in the ink cartridge 8 such as depicted in FIG. 2, foreign substance such as a fragment (a small piece) of a skin of a worker etc. may adhere to the wall surfaces 8c of the retaining space 8a of the ink cartridge 8 during the production etc., and then the foreign substance adhered to the wall surfaces 8c is mixed into the ink poured into the ink retaining space 8a when the ink is poured into the ink cartridge 8. Thus, if the production environments etc. of the plurality types of ink cartridges 8 are same, the number of the foreign substances per unit volume of the ink is larger as the total area $S_C$ of the wall surfaces 8c is larger. On the other hand, if the areas of the wall surfaces 8c are same among the plurality types of ink cartridges 8, the number of the foreign substances per unit volume of the ink is smaller as a volume $V_C$ of the ink retained in the retaining space 8a is larger. That is, the particle density of the ink in the ink cartridge 8 is in direct proportion to the total area $S_C$ of the wall surfaces 8c of the retaining space 8a and in inverse proportion to the volume $V_C$ of the ink retained in the retaining space 8a.

Note that, normally, when the volume of the retaining space 8a is increased by W times, the total area $S_C$ of the wall surfaces 8c is increased by less than W times. Specifically, in a case that the retaining space 8a has a rectangular shape such as that of the first embodiment, in order to increase the volume of the retaining space 8a by W times, for example, each of the areas of two pairs of opposing surfaces among the three pairs of opposing wall surfaces 8c constituting the rectangular shape is required to be increased by W times. In this case, however, the area of the remaining one pair of wall surfaces is not required to be changed. Thus, even if the volume of the retaining space 8a is increased by W times, the total area $S_C$ of the wall surfaces 8c is the value less than the value of $S_C$ multiplied by W. Accordingly, if the production environments etc. are same among the plurality types of ink cartridges 8, the particle density of the ink retained in the ink cartridge 8 is smaller for the ink cartridge 8 having the retaining space 8a of larger volume, that is, the ink cartridge 8 which has larger ink storage (ink storage amount).

Note that, in a case that the production environments etc. of the plurality types of ink cartridges 8 are same, the cake specific resistances of the retained ink are same among the plurality types of ink cartridges 8 because types of substances mixed in the ink in the plurality types of ink cartridges 8 are same.

In view of the factors as described above, in a case that the plurality types of ink cartridges 8 having mutually different ink storage are selectively installed in each cartridge installation portion 7, for example, the average cake specific resistance of the inks in the plurality types of ink cartridges 8 is regarded as the cake specific resistance $α_c$ in equation (1). Further, the average value of the particle densities of the inks in the plurality types of ink cartridges 8 is regarded as the particle density C in equation (1).

Alternatively, the cake specific resistance of the ink in the ink cartridge 8, among the plurality types of ink cartridges 8, which is expected to be used most frequently may be regarded as the cake specific resistance $α_c$ in equation (1), and the particle density of the ink in the aforementioned ink cartridge 8 which is expected to be used most frequently may be regarded as the particle density C in equation (1).

Here, "the ink cartridge which is expected to be used most frequently" will be explained referring as an example to the case in which either a standard ink cartridge or a large volume ink cartridge having a ink storage larger than that of the standard cartridge can be selectively installed in the cartridge installation portion 7.

In a case that the printer 1 is for house use, and if it is expected that ink consumption is increased only for a specific period, such as the period in which new year's greeting cards are prepared, and that the large volume ink cartridges are used during such period and the standard ink cartridges are used in a period other than such period, then it is assumed that the ratio between the number of the standard ink cartridges consumed and the number of the large volume ink cartridges consumed is, for example, approximately 10:1. Thus, in this case, the standard ink cartridge is regarded as the ink cartridge 8 which is expected to be used most frequently; and the cake specific resistance of the ink in the standard ink cartridge is regarded as the cake specific resistance $α_c$ in equation (1) and the particle density of the ink in the standard ink cartridge is regarded as the particle density C in equation (1).

On the other hand, in a case that the printer 1 is for business use, which prints more sheets than the printer 1 for house use, and if it is expected that the large volume ink cartridges are used during most of the operation period, then it is assumed that the ratio between the number of the standard ink cartridges consumed and the number of the large volume ink cartridges consumed is, for example, approximately 1:10. Thus, in this case, the large volume ink cartridge is regarded as the ink cartridge 8 which is expected to be used most frequently; and the cake specific resistance of the ink in the large volume ink cartridge is regarded as the cake specific resistance $α_c$ in equation (1) and the particle density of the ink in the large volume ink cartridge is regarded as the particle density C in equation (1).

The maximum value $V_{total}$ of the total volume of the ink flowing through the filter 51 during the period in which the printer 1 is used is, for example, the value obtained by multiplying the ink amount which is assumed to be consumed in printing an image on one recording sheet 100 with the printer 1 by the maximum printable number for the printer 1. Here, the ink amount which is assumed to be consumed in printing an image on one recording sheet 100 with the printer 1 is, for example, the ink amount which is consumed on printing one particular image on one recording sheet 100 with the printer 1. Alternatively, the ink amount which is assumed to be consumed in printing an image on one recording sheet 100 with the printer 1 may be the average ink amount consumed in printing one image on one recording sheet 100 with the printer 1. One specific example of the maximum value $V_{total}$ of a color ink is approximately $8.8·10^{-9}$ [$m^3$].

The maximum printable number for the printer 1 is a printable number which is described as durability or product life in catalogs or websites prepared by printer manufacturers for explaining their products. Alternatively, in the printer 1, the maximum printable number for the printer 1 may be set to be approximately 60,000 sheets, because printers are currently required by the market to be capable of printing approximately 60,000 sheets in A4 size.

In view of the above, the maximum value $V_{total}$ in equation (1) may be the ink amount required for printing the printable number of images which is the number described as the durability or the product life as explained above. Alternatively, the maximum value $V_{total}$ may be the ink amount required to print approximately 60,000 sheets in A4 size. Further alternatively, it is possible to estimate that the ink amount consumed in printing an image on one recording sheet 100 by the printer 1 is approximately $8.8·10^{-9}$ [$m^3$], the maximum printable number is approximately 60,000 sheets, and the maximum value $V_{total}$ is approximately $5.3·10^{-4}$ [$m^3$] ($=8.8·10^{-9}·60000$ [$m^3$]).

Next, the upper limit $ΔP_M$ of the pressure drop of the ink flowing through the filter 51 will be explained. In the printer 1, a pressure drop occurs when the ink flows in the ink channels from the ink cartridges 8 to the nozzles 15. If the value of the pressure drop exceeds certain upper limit, the ink amount supplied to the ink jet head 3 when the ink is jetted from the ink jet head 3 becomes less than the ink amount consumed in the ink-jet head 3 by the jetting of the ink. As a result, there is a fear that poor (inadequate) jetting of the ink is occurred at nozzles 15, and quality of printed images is deteriorated. Here, in a case that the number of nozzles 15 in communication with one manifold channel 11 is, for example, 140 and the maximum ink volume which can be jetted from one nozzle 15 at one time is, for example, not less than $35·10^{-12}$ [$m^3$], the upper limit of the pressure drop occurred in the entire ink channel extending from one of the ink cartridges 8 to the nozzles 15 is required to be not more than 7.5 [MPa]. Further, in the printer 1 in which the ink jet head 3 and the ink cartridges 8 are connected via the tubes 6, approximately 40% of the pressure drop of the ink occurred in the entire ink channel is the pressure drop occurred at the filter 51. Thus, in the equation (1), the value corresponds to approximately 40% of the upper limit of the pressure drop occurred in the entire ink channel is regarded as the value of $ΔP_M$.

Figure 6A:
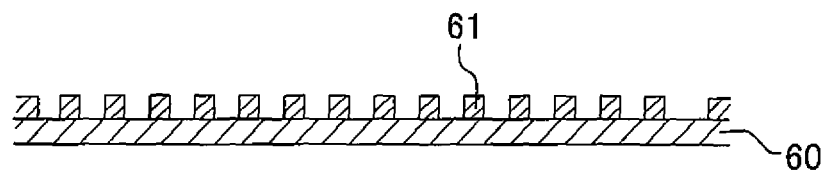
FIG. 6A is a cross-sectional view of a portion of a master block, the portion being corresponding to a portion of the filter depicted in FIG. 5B.
Figure 6B:
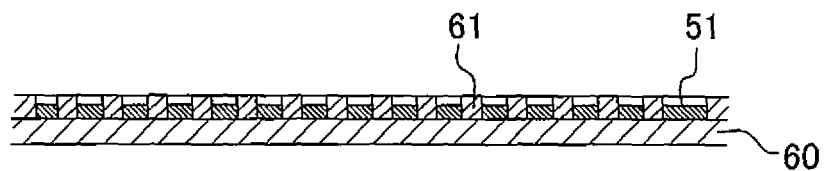
FIG. 6B is a cross-sectional view corresponding to FIG. 6A, that depicts a state in which metal to form a filter is deposited on the master block.
Figure 6C:
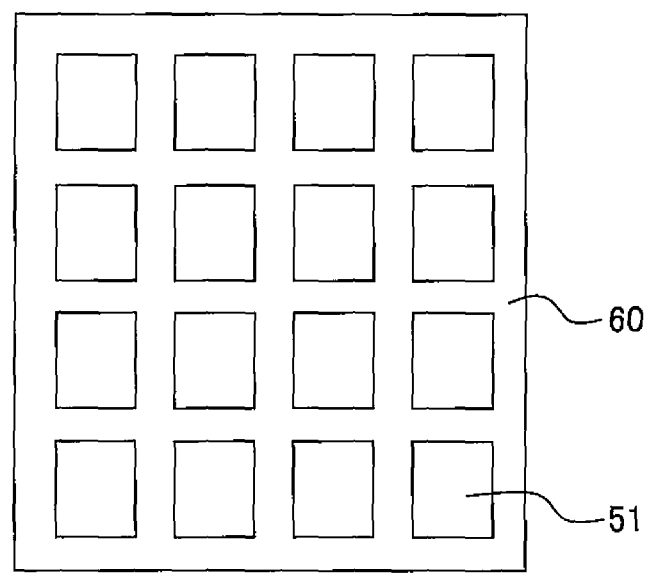
FIG. 6C is a plan view of the master block and the filter formed on the master block.

The filter 51 is an electroformed filter. The filter 51 is formed by using a master block (a master die) 60, which has a rectangular plane shape and of which surface is provided with a plurality of projections 61 corresponding to the plurality of through holes 52 as depicted in FIG. 6A, and depositing metal, such as nickel, on a portion of the surface of the master block 60 where the projections 61 are not provided as depicted in FIG. 6B. As depicted in FIG. 6C, a plurality of filters 51 are formed on the surface of one master block 60. Note that, the projections 61 of the master block 60 and the through holes 52 of the filter 51 are omitted from the FIG. 6C for convenience.

Generally, the sum of the areas of the plurality of filters 51 formed on the surface of the master block 60 is approximately 90% of the area of the master block 60. In view of this, the area S of the ink supply ports 16 and the filters 51 is determined such that S is not more than the upper limit $S_{max}$ expressed as:

$$S_{max} = \frac{S_b \cdot 0.9}{X}$$

provided that $S_b$ is the area of the master block 60, and X is the maximum number of the filter 51 formable on the master block 60 at a time (by one deposition process), the filter 51 having the area of the lower limit $S_{min}$. Note that, the maximum number X of the filter 51 formable on the master block 60 is a number which is defined based on an arrangement of the filters 51 on the master block 60 during a process in which the filters 51 having the area $S_{min}$ is formed on the master block 60, and the maximum number X is slightly smaller than $0.9\, S_b/S_{min}$.

In the ink-jet head 3, the area S of the ink supply ports 16 and the filters 51 is usually set to be the area somewhat larger than the lower limit $S_{min}$ leaving a margin. In this case, if the area S of the filters 51 is not more than the upper limit $S_{max}$, the maximum number X of the filter 51 formable on the master block 60 at a time (by one deposition process) does not drop even if the area S of the filters 51 is set to be larger than the lower limit $S_{min}$.

In the first embodiment, the area S of the filters 51 can be set appropriately by setting the area S of the filters 51 such that the condition of $S_{min} \leq S \leq S_{max}$ holds as described above.

Note that, in the first embodiment, the printer 1 corresponds to a liquid jetting apparatus of the present teaching, the ink jet head 3 corresponds to a liquid jetting head of the present teaching and the ink cartridge 8 corresponds to a liquid cartridge of the present teaching.

Second Embodiment

Next, the second embodiment of the present teaching will be explained. The only difference between the second embodiment and the first embodiment is the upper limit $S_{max}$ of the area S of the filters 51. Thus, in the following paragraphs, the upper limit $S_{max}$ will be mainly explained.

As described above, the area S of the filters 51 may be somewhat larger than the lower limit $S_{min}$. In the ink jet head 3, the filter 51 is provided at each of the four ink supply ports 16, and thus, the total area $S_R$ obtained by summing the areas $S-S_{min}$ is $4(S-S_{min})$. Here, $S-S_{min}$ is the area of a portion of each filter 51, the portion being defined, in each filter 51, outside of a portion having the area of the lower limit $S_{min}$. If the total area $S_R$ is larger than the lower limit $S_{min}$, then the area $4(S-S_{min})$ which is the total area of the portions of the four filters 51, each portion being defined, in each filter 51, outside of the portion having the area of the lower limit $S_{min}$, is larger than the area $S_{min}$ of one filter 51 having the area of the lower limit $S_{min}$. This means that the area S of the filter 51 is excessively large.

In view of this, in the second embodiment, the area S of the ink supply ports 16 and the filters 51 is determined such that the area S fulfills the condition of $4(S-S_{min}) \leq S_{min}$. That is, the area S of the ink supply ports 16 and the filters 51 is determined such that the area S is not more than the upper limit $S_{max}$ expressed as follows.

$$S_{max} = \frac{5}{4} S_{min}$$

With this, the area S of the ink supply ports 16 and the filters 51 is prevented from being excessively large.

Note that, in the second embodiment, the ink jet head 3 jets four types of ink having different colors, and four filters 51 is provided in the ink-jet head 3. However, there is no limitation to this. The ink jet head 3 may jet one type of ink and may be provided with one filter. Further, the ink-jet head 3 may jet 2, 3 or not less than 5 types of ink having different colors and may be provided with 2, 3 or not less than 5 filters, respectively.

In this case, provided that the number of ink supply port(s) 16 and the filter(s) 51 provided on the ink jet head 3 is Y, the area S of the filter(s) 51 may be set to be not more than the upper limit $S_{max}$ expressed as:

$$S_{max} = \frac{Y+1}{Y} S_{min}$$

The second embodiment corresponds to the case where "Y" in the above equation is four.

Third Embodiment

Next, the third embodiment of the present teaching will be explained. The only difference between the third embodiment and the first and second embodiments is the upper limit $S_{max}$ of the area S of the filters 51. Thus, in the following paragraphs, the upper limit $S_{max}$ will be mainly explained.

In the third embodiment, a plurality types of ink cartridges 8 having ink storages different from each other can be selectively installed in each cartridge installation portion 7. In this case, as described above, the cake specific resistance $\alpha_c$ and the particle density C may vary from one ink cartridge 8 to another.

In the third embodiment, provided that $(\alpha_c C)_{max}$ is the value of the product $\alpha_c C$ of one ink cartridge 8, among the plurality types of ink cartridges 8 installable in the cartridge installation portions 7, having the value of the product $\alpha_c C$ larger than that of any other ink cartridge 8, the product $\alpha_c C$ being the product of the cake specific resistance $\alpha_c$ and the particle density C, and provided that $b_{max}$ is a constant expressed as:

$$b_{max} = (\alpha_c C)_{max} V_{total}$$

the area S of the ink supply ports 16 and the filters 51 is determined such that the area S is not more than the upper limit $S_{max}$ expressed as follows.

$$S_{max} = \frac{aL + \sqrt{a^2 L^2 + 4ab_{max}}}{2}$$

In the printer 1, in a case that only a certain ink cartridge 8, among the plurality types of ink cartridges 8, having the largest value of the product $\alpha_c C$ is used throughout the operation period, the increase of the pressure drop $\Delta P$ of the ink at the filter 51 is larger than any other cases. Thus, if it is regarded that the upper limit $S_{max}$ is the area of the filter 51, with which the condition of $\Delta P = \Delta P_M$ will hold in a case that only the certain ink cartridge 8 having the value of the product $\alpha_c C$ larger than that of any other ink cartridge 8 is used throughout the operation period, the pressure drop $\Delta P$ does not go above $\Delta P_M$, in every cases in which the plurality types of ink cartridges 8 are used in arbitrary order and combination. Further, the area S of the ink supply ports 16 and the filters 51 is prevented from being excessively large.

Fourth Embodiment

Next, the fourth embodiment of the present teaching will be explained. The printer 1 of the fourth embodiment is configured such that a plurality types of ink cartridges 8, having the ink storage different from each other can be selectively installed in each cartridge installation portion 7 (see, FIG. 1). In the fourth embodiment, provided that the number of each ink cartridge 8 estimated to be consumed is $m_i$, a lower limit $S_{min}$ is determined based on b expressed as follows.

$$b = \sum_i \alpha_{ci} C_i V_i m_i$$

Here, the number $m_i$ of the plurality types of ink cartridges 8 estimated to be consumed at the ink cartridge installation portion 7 is the number of each ink cartridge 8 which is estimated to be installed in the ink cartridge installation portion 7 before the above maximum printable number of images have been printed by the printer 1 (see, FIG. 1).

For example, in a case that the printer 1 is for house use, and it is estimated that the normal ink cartridges and the large volume ink cartridges are installed in the cartridge installation portion 7 in the ratio of 10:1 as described above, provided that the number of the normal ink cartridges to be consumed is $m_j$, the number of the large volume ink cartridges to be consumed can be expressed as $0.1\,m_j$. Then, provided that the amount of the ink retained in the normal ink cartridge is $V_1$ and the amount of the ink retained in the large volume ink cartridge is $V_2$, the value of $m_j$ which is the minimum value satisfying the condition of $m_j V_1 + 0.1\,m_j V_2 \geq V_{total}$ is regarded as the number $m_1$ of the normal ink cartridges to be consumed and $0.1\,m_j$ is regarded as the number $m_2$ of the large volume ink cartridges to be consumed.

Alternatively, for example, in a case that the printer 1 is business use, and it is estimated that the normal ink cartridges and the large volume ink cartridges are installed in the ink cartridge installation portion 7 in the ratio of 1:10, provided that the number of the normal ink cartridges to be consumed is $m_j$, the number of the large volume ink cartridges to be consumed can be expressed as $10\,m_j$. Then, provided that the amount of the ink retained in the normal ink cartridge is $V_1$ and the amount of the ink retained in the large volume ink cartridge is $V_2$, the value of $m_j$ which is the minimum value satisfying the condition of $m_j V_1 + 10\,m_j V_2 \geq V_{total}$ is regarded as the number $m_1$ of the normal ink cartridges to be consumed and $10\,m_j$ is regarded as the number $m_2$ of the large volume ink cartridges to be consumed.

In the fourth embodiment, the value of b is calculated using the cake specific resistance $\alpha_{ci}$, the particle density $C_i$ and the ink storage $V_i$ of each ink cartridge 8. Because those values belong to the ink in each ink cartridge 8 actually installed in the ink installation portion 7, the lower limit $S_{min}$ determined based on the value of b assuredly corresponds to the area of the filter 51 with which the condition of $\Delta P = \Delta P_M$ holds after the printer 1 has printed the maximum printable number of images.

Next, an explanation will be made about modifications in which various changes are applied to the first to fourth embodiments.

In the second and third embodiments, unlike the first embodiment, the filters 51 can be any filter other than the electroformed filter.

In the first to fourth embodiments, the diameter D2 of the through holes 52 of the filters 51 is not more than 20 μm. However, there is no limitation to this. In a case that the diameter of the nozzles 15 is not less than 20 μm, the diameter of the through holes 52 can have the size of larger than 20 μm and not more than 40 μm. In this case also, the diameter D2 of the through holes 52 is smaller than the foreign substances, such as a fragment of a skin, in the ink, and thus the pressure drop ΔP at the filter 51 can be appropriately estimated based on the cake theory. Accordingly, in this case also, the area of the filters 51 is prevented from being excessively small by determining the lower limit $S_{min}$ of the area S of the filters 51 in the similar manner as the first to third embodiments.

Further, in a case that the majority of the foreign substances in the ink has the size larger than 40 μm, the diameter D2 of the through holes 52 of the filters 51 can be larger than 40 μm.

In the first to fourth embodiments, the printer 1 has a construction with which the ink retained in the ink cartridges 8 is supplied to the ink-jet head 3 through the tubes 6, and thus the value of $\Delta P_M$ is set to be approximately 40% of the upper limit of the pressure drop of the ink occurred in the entire ink channel, that is 7.5 MPa. However, there is no limitation to this. For example, in the printer in which cartridge installation portions are arranged on a carriage, the ratio of the pressure drop of the ink occurred at the filter 51 in the pressure drop of the ink occurred in the entire ink channel is high due to absence of tubes. For example, $\Delta P_M$ may be approximately 70% of the upper limit of the pressure drop of the ink occurred in the entire ink channel.

In the first to fourth embodiments, the filter 51 is individually provided at each of four ink supply ports 16. However, there is no limitation to this. A filter may be provided such that the filter extends over 2 or more ink supply ports 16. In this case, the area of a portion of the filter, the portion being overlapped with each ink supply port 16, is determined in the manner similar to those described above.

In the above, the explanations have been made with respect to the examples in which the present teaching is applied to the printer having the ink-jet head which jets the ink from the nozzles. However, there is no limitation to this. It is possible to apply the present teaching to any liquid jetting device, other than the printer, provided with a liquid-jet head which jets liquid other than ink.

Further, the present teaching can be described in accordance with the following items:

A filter area determining method used for a liquid jetting apparatus including: a liquid jetting head configured to jet a liquid from a nozzle; a cartridge installation portion to which a liquid cartridge retaining the liquid to be supplied to the liquid jetting head is installed; and a filter which has a plurality of through holes and which is provided in a channel extending from the cartridge installation portion to the liquid jetting head, to determine a lower limit $S_{min}$ of an area of the filter, the method comprising, determining that the lower limit $S_{min}$ is $$S_{min} = \frac{aL + \sqrt{a^2 L^2 + 4ab}}{2}$$

provided that μ is a viscosity of the liquid; Q is a maximum value of a flow rate of the liquid flowing through the filter in a case that the liquid is jetted from the nozzle; N is the number of the through holes per unit area of the filter; d is a diameter of the through holes; $\Delta P_M$ is an upper limit of a pressure drop of the liquid at the filter; $\alpha_c$ is a cake specific resistance of the liquid flowing through the filter, C is a particle density of the liquid flowing through the filter; $V_{total}$ is a maximum value of a sum of a volume of the liquid flowing through the filter during a period in which the liquid jetting apparatus is used, a is a constant expressed as:

$$a = \frac{128\mu Q}{N\pi d^4 \Delta P_M}$$

b is a constant expressed as:

$$b = \alpha_c C V_{total}$$

and L is a thickness of the filter.

What is claimed is:
1. A liquid jetting apparatus comprising:
a liquid jetting head configured to jet a liquid from a nozzle;
a cartridge installation portion to which a liquid cartridge retaining the liquid to be supplied to the liquid jetting head is installed; and
a filter provided in a channel extending from the cartridge installation portion to the liquid jetting head,
wherein, the filter is an electroformed filter which is formed by depositing metal on a master block and in which a plurality of through holes is formed,
an area S of the filter satisfies a condition of $S_{min} \leq S \leq S_{max}$ provided that $S_{min}$ is a lower limit and $S_{max}$ is an upper limit,
the lower limit $S_{min}$ is expressed as

$$S_{min} = \frac{aL + \sqrt{a^2 L^2 + 4ab}}{2}$$

provided that $\mu$ is a viscosity of the liquid; Q is a maximum value of a flow rate of the liquid flowing through the filter in a case that the liquid is jetted from the nozzle; N is the number of the through holes per unit area of the filter; d is a diameter of the through holes; $\Delta P_M$ is an upper limit of a pressure drop of the liquid at the filter; $\alpha_c$ is a cake specific resistance of the liquid flowing through the filter, C is a particle density of the liquid flowing through the filter; $V_{total}$ is a maximum value of a total volume of the liquid flowing through the filter during a period in which the liquid jetting apparatus is used, a is a constant expressed as:

$$a = \frac{128\mu Q}{N\pi d^4 \Delta P_M}$$

b is a constant expressed as:

$$b = \alpha_c C V_{total}$$

and L is a thickness of the filter,
the upper limit $S_{max}$ is expressed as:

$$S_{max} = \frac{S_b \cdot 0.9}{X}$$

provided that $S_b$ is an area of the master block and X is a maximum number of a filter, having the area of the lower limit $S_{min}$, formable on the master block at a time.
2. The liquid jetting apparatus according to claim 1, wherein the cartridge installation portion is configured such that a plurality types of liquid cartridges are capable of selectively being installed in the cartridge installation portion, and b is expressed as:

$$b = \sum_i \alpha_{ci} C_i V_i m_i$$

provided that cake specific resistances of liquids retained in the plurality types of liquid cartridges are $\alpha_{ci}$ (i=1, 2, ... ) respectively, particle densities of liquids retained in the plurality types of liquid cartridges are Ci respectively, liquid storage amounts of the plurality types of liquid cartridges are Vi respectively, and numbers of the plurality types of liquid cartridges estimated to be consumed at the cartridge installation portion are $m_i$ respectively.
3. The liquid jetting apparatus according to claim 1, wherein the diameter d of the through holes is not more than 40 μm.
4. The liquid jetting apparatus according to claim 3, wherein a diameter of the nozzle is not more than 20 μm and the diameter d of the through holes is not more than the diameter of the nozzle.
5. The liquid jetting apparatus according to claim 1, wherein the filter covers a liquid supply port formed on the liquid jetting head; and
the area S of the filter is an area of a portion of the filter, the portion being overlapped with the liquid supply port and being configured to capture foreign substances in the liquid.
6. The liquid jetting apparatus according to claim 1, wherein the cake specific resistance is a volume of foreign substances per unit mass of the foreign substances, the foreign substances being mixed in the liquid flowing through the filter.
7. A liquid jetting apparatus comprising:
a liquid jetting head configured to jet a liquid from a nozzle;
Y pieces of cartridge installation portions to which liquid cartridges retaining the liquid to be supplied to the liquid jetting head are installed respectively; and
Y pieces of filters, having a plurality of through holes formed therein, provided in channels respectively, the channels extending from the Y pieces of cartridge installation portions to the liquid jetting head,
wherein, an area S of the filter satisfies a condition of $S_{min} \leq S \leq S_{max}$ provided that $S_{min}$ is a lower limit and $S_{max}$ is an upper limit,
the lower limit $S_{min}$ is expressed as:

$$S_{min} = \frac{aL + \sqrt{a^2 L^2 + 4ab}}{2}$$

provided that $\mu$ is a viscosity of the liquid; Q is a maximum value of a flow rate of the liquid flowing through the filter in a case that the liquid is jetted from the nozzle; N is the number of the through holes per unit area of the filter; d is a diameter of the through holes; $\Delta P_M$ is an upper limit of a pressure drop of the liquid at the filter; $\alpha_c$ is a cake specific resistance of the liquid flowing through the filter, C is a particle density of the liquid flowing through the filter; $V_{total}$ is a maximum value of a total volume of the liquid flowing through the filter during a period in which the liquid jetting apparatus is used, a is a constant expressed as:

$$a = \frac{128\mu Q}{N\pi d^4 \Delta P_M}$$

b is a constant expressed as:

$$b = \alpha_c C V_{total}$$

and L is a thickness of the filter,
the upper limit $S_{max}$ is expressed as $$S_{max} = \frac{Y+1}{Y} S_{min}$$

8. The liquid jetting apparatus according to claim 7, wherein the cartridge installation portion is configured such that a plurality types of liquid cartridges are capable of selectively being installed in the cartridge installation portion, and b is expressed as:

$$b = \sum_i \alpha_{ci} C_i V_i m_i$$

provided that cake specific resistances of liquids retained in the plurality types of liquid cartridges are $\alpha_{ci}$ (i=1, 2, ... ) respectively, particle densities of liquids retained in the plurality types of liquid cartridges are Ci respectively, liquid storage amounts of the plurality types of liquid cartridges are Vi respectively, and numbers of the plurality types of liquid cartridges estimated to be consumed at the cartridge installation portion are $m_i$ respectively.

9. The liquid jetting apparatus according to claim 7, wherein the diameter d of the through holes is not more than 40 μm.

10. The liquid jetting apparatus according to claim 9, wherein a diameter d of the nozzle is not more than 20 μm and the diameter b of the through holes is not more than the diameter of the nozzle.

11. The liquid jetting apparatus according to claim 7, wherein the filter covers a liquid supply port formed on the liquid jetting head; and
the area S of the filter is an area of a portion of the filter, the portion being overlapped with the liquid supply port and being configured to capture foreign substances in the liquid.

12. The liquid jetting apparatus according to claim 7, wherein the cake specific resistance is a volume of foreign substances per unit mass of the foreign substances, the foreign substances being mixed in the liquid flowing through the filter.

13. A liquid jetting apparatus comprising:
a liquid jetting head configured to jet a liquid from a nozzle;
a cartridge installation portion to which a liquid cartridge retaining the liquid to be supplied to the liquid jetting head is installed; and
a filter which is provided in a channel extending from the cartridge installation portion to the liquid jetting head and in which a plurality of through holes is formed,
wherein, the cartridge installation portion is configured such that a plurality types of the liquid cartridges are capable of selectively being installed in the cartridge installation portion, an area S of the filter satisfies a condition of $S_{min} \leq S \leq S_{max}$ provided that $S_{min}$ is a lower limit and $S_{max}$ is an upper limit,
the lower limit $S_{min}$ is expressed as:

$$S_{min} = \frac{aL + \sqrt{a^2 L^2 + 4ab}}{2}$$

provided that μ is a viscosity of the liquid; Q is a maximum value of a flow rate of the liquid flowing through the filter in a case that the liquid is jetted from the nozzle; N is the number of the through holes per unit area of the filter; d is a diameter of the through holes; $\Delta P_M$ is an upper limit of a pressure drop of the liquid at the filter; $\alpha_c$ is a cake specific resistance of the liquid flowing through the filter, C is a particle density of the liquid flowing through the filter; $V_{total}$ is a maximum value of a total volume of the liquid flowing through the filter during a period in which the liquid jetting apparatus is used, a is a constant expressed as:

$$a = \frac{128\mu Q}{N\pi d^4 \Delta P_M}$$

b is a constant expressed as:

$$b = \alpha_c C V_{total}$$

and L is a thickness of the filter,
the upper limit $S_{max}$ is expressed as:

$$S_{max} = \frac{aL + \sqrt{a^2 L^2 + 4ab_{max}}}{2}$$

provided that $(\alpha_c C)_{max}$ is the product $\alpha_c C$ of certain liquid, the product $\alpha_c C$ being the product of the cake specific resistance $\alpha_c$ and the particle density C, the certain liquid being a liquid having a value of $\alpha_c C$ which is the largest among values of $\alpha_c C$ of liquids retained in the plurality types of liquid cartridges respectively, and $b_{max}$ is a constant expressed as:

$$b_{max} = (\alpha_c C)_{max} V_{total}.$$

14. The liquid jetting apparatus according to claim 13, wherein b is expressed as:

$$b = \sum_i \alpha_{ci} C_i V_i m_i$$

provided that cake specific resistances of liquids retained in the plurality types of liquid cartridges are $\alpha_{ci}$ (i=1, 2, ... ) respectively, particle densities of liquids retained in the plurality types of liquid cartridges are Ci respectively, liquid storage amounts of the plurality types of liquid cartridges are Vi respectively, and numbers of the plurality types of liquid cartridges estimated to be consumed at the cartridge installation portion are $m_i$ respectively.

15. The liquid jetting apparatus according to claim 13, wherein the diameter d of the through holes is not more than 40 μm.

16. The liquid jetting apparatus according to claim 15, wherein a diameter of the nozzle is not more than 20 μm and the diameter d of the through holes is not more than the diameter of the nozzle.

17. The liquid jetting apparatus according to claim 13, wherein the filter covers a liquid supply port formed on the liquid jetting head; and
- the area S of the filter is an area of a portion of the filter, the portion being overlapped with the liquid supply port and being configured to capture foreign substances in the liquid.

18. The liquid jetting apparatus according to claim 13, wherein the cake specific resistance is a volume of foreign substances per unit mass of the foreign substances, the foreign substances being mixed in the liquid flowing through the filter.

* * * * *